Patented June 26, 1945

2,379,222

UNITED STATES PATENT OFFICE 2,379,222

ANHYDRITE PLASTERS

Joseph John Etridge and Francis Robert Himsworth, Norton-on-Tees, and Victor Lefebure, London, England, assignors, by mesne assignments, to said Lefebure No Drawing. Application March 2, 1943, Serial No. 477,768. In Great Britain March 13, 1942

3 Claims. (Cl. 106—109)

This invention relates to plaster compositions comprising anhydrous calcium sulphate, in particular finely ground unburnt mineral anhydrite, having incorporated therewith substances capable of accelerating or catalysing the setting of the anhydrite in the presence of water. These plaster compositions may be used for many purposes, for example as wall plasters, as decorative plasters, as binders, for moulding set masses, or in the production of plaster board. It is known to employ as catalysts single component catalysts comprising an alkali metal salt and two-component catalysts comprising the double salt of an alkali metal with another metal, e. g. alum, or mixtures of the component salts constituting such double salts. Thus it is known to employ a two-component catalyst consisting of a mixture of potassium sulphate and zinc sulphate and in British Specification No. 459,134 there is described and claimed a plaster of this kind containing a proportion of zinc sulphate and potassium sulphate not greater than 1.7 gms. per 100 gms. of anhydrite, the proportion of zinc sulphate lying between 0.2 and 0.7 part by weight for every part by weight of potassium sulphate. The smallest proportion of total catalyst described in the said specification is 1.25 gms. per 100 gms. of anhydrite.

We have now found that greatly improved results are obtained by employing a catalyst comprising an alkali metal sulphate or ammonium sulphate, a di-valent metal sulphate and a tri-valent metal sulphate and our invention consists in plaster compositions containing anhydrous calcium sulphate so catalysed. Examples of the alkali metal sulphates which we may use according to the present invention are potassium sulphate, sodium sulphate and the corresponding acid sulphates, although it should be noted that sodium sulphate has the disadvantage that it sometimes causes efflorescence. Ammonium hydrogen sulphate may also be used. All these are conveniently employed in the form of the anhydrous salts. As the di-valent sulphate we may use zinc sulphate, cupric sulphate or ferrous sulphate, these conveniently in the form of the salts indicated by the formulae—

$$ZnSO_4.7H_2O$$
$$CuSO_4.5H_2O$$
$$FeSO_4.7H_2O$$

As examples of the tri-valent metal sulphates we may use aluminium sulphate or ferric sulphate conveniently in the form of the salts indicated by the formulae—

$Al_2(SO_4)_3.13H_2O$ (not a true hydrate: empirical analysis)

$Fe_2(SO_4)_3.9H_2O$

Cupric or ferrous sulphates when used as the di-valent metal sulphate colour the set plaster composition. Magnesium sulphate is unsuitable for use according to the present invention because it possesses little catalytic effect and causes efflorescence. Ferric sulphate when used as the tri-valent metal sulphate gives results which are slightly inferior to aluminium sulphate and colours the set plaster composition. Chromium sulphate is ineffective. The catalysts used according to the present invention may be made up from single or double salts but the former are preferred because when they are used it it very much easier to vary the relative proportions of the components.

The proportion of the catalyst used in accordance with the invention is preferably between 0.5 and 2 parts by weight of catalyst for every 100 parts of anhydrite. Although where the plasters has to be used in the manufacture of moulded set masses or in the production of plaster board or for other purposes for which a rapid initial set is required, the proportion of catalyst may be increased beyond the stated limits, for example up to 4 parts by weight per 100 parts of anhydrite. These proportions are calculated on the basis that the alkali metal and ammonium sulphates are used in the anhydrous form and that as di-valent and tri-valent metal sulphates there are used the hydrated salts indicated by the specific formulae set out above. It will be understood that equivalent proportions of other hydrates or of the anhydrous salts may be substituted.

The advantages secured by the present invention are that we can with a given weight of total catalyst, produce plaster compositions having more rapid sets than have been hitherto obtainable with one or two component catalysts made from the corresponding salts unless high quantities of the latter were used; that we can, on the other hand, use less of the three component catalyst to yield a composition with a given time of set; that the catalysts are cheaper weight for weight and more economical than those hitherto known; and that they increase the rate of hardening of the composition. Rapid setting is particularly important when the compositions are used for moulding set masses. Increase in the rate of hardening is of special value in the case of plaster compositions made from natural mineral anhydrite containing carbonate. Plaster compositions made with the catalysts of the invention are satisfactory for all uses of the anhydrite type of plaster. We have found that the greatest improvements are achieved with catalysts comprising potassium sulphate, zinc sulphate and aluminium sulphate and that when they are employed to give a plaster composition of a given set a considerably smaller quantity of total catalyst, namely about half the previously usual quantity, can be used. Our preferred catalyst is therefore one comprising potassium sulphate, zinc sulphate and aluminium sulphate.

It is possible with successful results to replace a portion of any or all of the components by the chemically equivalent quantity of the sulphate of one or more metals of the same valency and the invention is to be taken as including plasters with such catalysts.

It will be understood that the three-component catalysts used in accordance with the present invention may give rise to voiding in plaster compositions based on natural mineral anhydrite containing any appreciable quantity of carbonate. This is true particularly in the case of three-component catalysts containing aluminium sulphate and alkali metal acid sulphates, and if it is desired to prevent voiding when working with such catalysts the total amount of aluminium sulphate and alkali metal acid sulphate should not exceed 0.4% by weight.

In carrying out the invention the normal methods of production are used. For example crushed rock together with the preferred proportions of catalysts is introduced into a tube mill and ground until at least 80% passes a British Standard screen 172, the operation generally taking about half-an-hour. The ordinary pure or commercially pure grades of the catalyst salts are suitable. We have found that commercially available grades of potassium sulphate and zinc sulphate containing respectively 95% $K_2SO_4$, 98% $ZnSO_4.7H_2O$, and a commercially available grade of aluminium sulphate having an alumina equivalent of 17.5% are suitable and the references to proportions hereinafter in this specification are to these grades. This grade of aluminium sulphate is well known in the paper industry and is not a definite hydrate but contains on the average 13 molecules of water and is 99% pure. The required quantities of other grades can readily be found by calculation if their degree of purity is known.

We have found that good results are obtained using catalysts in which the ratio of the weight of the potassium sulphate to the sum of the weights of the zinc sulphate and aluminium sulphate is between 9:1 and 1:1, but that taking rate of hardening into account the best results are obtained with catalysts in which this ratio is between 4:1 and 1:1. The rates of hardening of the compositions may be compared by indenting slabs of the setting compositions under the same standard conditions at the same regular time intervals and comparing the depth of the indentations.

Working on the small scale, with 15 lb. batches of anhydrite and mixing in a 10" diameter steel ball mill charged with ½" diameter steel balls, we have found that with these ratios a proportion of total catalyst of 1.25–0.5 parts per 100 parts by weight of anhydrite yields a good, quick-setting plaster of normal properties. This range will be called the optimum in the following description.

Although the optimum concentration of the catalyst used according to the invention lies between 1.25% and 0.5% by weight of the anhydrite the following important practical points must be taken into consideration. We have found, in manufacturing catalysed plasters from mineral anhydrite that it is necessary under large scale milling conditions, due apparently to the difference in milling conditions and to the varying reactivity and purity of the anhydrite, to employ about 60% more than the optimum amount of total catalyst found on the small scale. For these reasons therefore, although the optimum range of catalyst is from 0.5 up to 1.25 parts by weight of the calcium sulphate, we prefer in practice to use from 0.5 up to 2.0 parts by weight.

The advantages afforded by the improved catalyst combinations are shown by the results of tests carried out on samples of mineral anhydrite, of British and Canadian origin, which are given in Tables 1–3. The Canadian sample was a less reactive type of anhydrite. We have found that similar results are obtained with chemically produced anhydrous calcium sulphate.

The initial set referred to is measured by the standard Vicat needle. The water quantity employed in this test is that necessary to give plastering consistency and varies between 23% and 27% by weight of the dry plaster.

Table 1 illustrates the improvement in rate of setting resulting from the use of a three-component catalyst as contrasted with a two-component catalyst of the kind known hitherto and consisting of zinc sulphate and potassium sulphate. This is further exemplified in Table 3. Tables 2 and 3 also illustrate the effect on the time of set, of variations in the total amount of catalyst and proportioning of catalyst components.

TABLE 1

| Kind of anhydrite | Composition of catalysts in parts per 100 parts of anhydrite by weight. Total proportion of catalyst=2 parts per 100 | | | Initial set in minutes |
|---|---|---|---|---|
| | Potassium sulphate | Zinc sulphate | Aluminium sulphate | |
| Sample of British origin. | 1.6 | 0.4 | ---------- | 13 |
| | 1.2 | 0.8 | ---------- | 18 |
| | 1.0 | 1.0 | ---------- | 25 |
| | 0.8 | 1.2 | ---------- | 24 |
| | 1.6 | 0.2 | 0.2 | 8 |
| | 1.2 | 0.6 | 0.2 | 12 |
| | 0.8 | 1.0 | 0.2 | 17 |
| Sample of Canadian origin. | 1.6 | 0.4 | ---------- | 19 |
| | 1.6 | 0.3 | 0.1 | 18 |
| | 1.6 | 0.2 | 0.2 | 17 |
| | 1.6 | 0.1 | 0.3 | 14 |

TABLE 2

Sample of anhydrite of British origin

| Parts of catalyst per 100 parts of anhydrite by weight | | | | Initial set in minutes |
|---|---|---|---|---|
| Potassium sulphate | Zinc sulphate | Aluminium sulphate | Total catalyst | |
| 1.05 | 0.30 | 0.15 | 1.5 | 9 |
| 1.05 | 0.15 | 0.30 | 1.5 | 11 |
| 0.90 | 0.45 | 0.15 | 1.5 | 14 |
| 0.90 | 0.30 | 0.30 | 1.5 | 10 |
| 0.70 | 0.20 | 0.10 | 1.0 | 12 |
| 0.70 | 0.10 | 0.20 | 1.0 | 15 |
| 0.60 | 0.30 | 0.10 | 1.0 | 27 |

Table 3
*Further sample of anhydrite of British origin*

| Parts of catalyst per 100 parts of anhydrite by weight | | | | Initial set in minutes |
|---|---|---|---|---|
| Potassium sulphate | Zinc sulphate | Aluminium sulphate | Total catalyst | |
| 1.00 | 1.00 |  | 2.0 | 16 |
| 1.60 | 0.40 |  | 2.0 | 17½ |
| 0.80 | 0.20 |  | 1.0 | 18½ |
| 1.00 | 0.80 | 0.20 | 2.0 | 12½ |
| 0.90 | 0.20 | 0.10 | 1.2 | 15 |
| 0.90 | 0.05 | 0.05 | 1.0 | 13 |
| 0.60 | 0.30 | 0.10 | 1.0 | 11 |
| 0.50 | 0.40 | 0.10 | 1.0 | 13 |
| 0.75 | 0.15 | 0.10 | 1.0 | 11½ |
| 0.60 | 0.10 | 0.10 | 0.8 | 15 |
| 0.45 | 0.05 | 0.10 | 0.6 | 17 |
| 0.30 | 0.05 | 0.05 | 0.4 | 34 |

As previously stated the plaster compositions of this invention may be used for the same purposes as previously known anhydrous calcium sulphate plasters. They may be used, for example, as wall plasters, as decorative plasters and in aggregates for these, as cementitious binders and for moulding set masses. To confer special properties known modifying agents may be added to the compositions, e. g. pigments, coloured and decorative aggregate of the kind described in British Specification No. 451,113, graded mineral aggregate, inert materials, asbestos, sawdust, wood pulp, paper or textile fibres.

We claim:
1. A plaster composition comprising 100 parts by weight of anhydrous calcium sulphate and, as catalyst therefor, between 0.5 and 2 parts by weight of a mixture of potassium sulphate, zinc sulphate and aluminum sulphate, the weights of the zinc sulphate and aluminum sulphate being calculated as the respective hydrated salts

$ZnSO_4 \cdot 7H_2O$ and $Al_2(SO_4)_3 \cdot 13H_2O$, and the ratio of the weight of potassium sulphate to the sum of the weights of zinc sulphate and aluminum sulphate lying between 9:1 and 1:1.

2. A plaster composition comprising 100 parts by weight of anhydrous calcium sulphate and, as catalyst therefor, between 0.5 and 2 parts by weight of a mixture of potassium sulphate, zinc sulphate and aluminum sulphate, the weights of the zinc sulphate and aluminum sulphate being calculated as the respective hydrated salts $ZnSO_4 \cdot 7H_2O$ and $Al_2(SO_4)_3 \cdot 13H_2O$, and the ratio of the weight of potassium sulphate to the sum of the weights of zinc sulphate and aluminum sulphate lying between 4:1 and 9:1.

3. A plaster composition as claimed in claim 1, in which the anhydrous calcium sulphate is finely ground, unburnt mineral anhydrite.

JOSEPH JOHN ETRIDGE.
FRANCIS ROBERT HIMSWORTH.
VICTOR LEFEBURE.